(12) United States Patent
Yang et al.

(10) Patent No.: US 8,923,925 B2
(45) Date of Patent: Dec. 30, 2014

(54) FORM FACTOR FOR A HAND-HELD INFORMATION DEVICE WITH AN OUTPUT DISPLAY

(75) Inventors: Tae Young Yang, Cary, NC (US); Paul Ernest Earl, Apex, NC (US)

(73) Assignee: HTC Corporation (TW)

( * ) Notice: Subject to any disclaimer, the term of this patent is extended or adjusted under 35 U.S.C. 154(b) by 197 days.

(21) Appl. No.: 13/598,480

(22) Filed: Aug. 29, 2012

(65) Prior Publication Data

US 2014/0066130 A1  Mar. 6, 2014

(51) Int. Cl.
*H04M 1/00* (2006.01)
*H04B 1/02* (2006.01)

(52) U.S. Cl.
USPC .......................................... 455/566; 455/90.3

(58) Field of Classification Search
USPC ............................... 455/90.3, 575.1; 345/173
See application file for complete search history.

(56) References Cited

U.S. PATENT DOCUMENTS

2009/0219250 A1\* 9/2009 Ure .............................. 345/169
2012/0214412 A1\* 8/2012 Schlub et al. ................ 455/41.1

OTHER PUBLICATIONS

Shanklin, Will; "Pen-shaped e-reader concept leads to more questions than answers"; http://www.geek.com/news/pen-shaped-e-reader-concept-leads-to-more-questions-than-answers-1466095/, Feb. 8, 2012.

\* cited by examiner

*Primary Examiner* — Lee Nguyen
(74) *Attorney, Agent, or Firm* — Andrews Kurth LLP; Scott Bloebaum (57) ABSTRACT

The invention relates to hand-held electronic devices that can have a spherical, cylindrical or other curved surface and an output display providing output visible on the curved surface. The interior region of the device can house receiver circuitry coupled to an antenna to enable reception of transmitted radio signals, display control circuitry, physical stimulus processing circuitry, a microprocessor, data storage memory, and a battery. Display and antenna configurations and data processing methods are also disclosed.

6 Claims, 13 Drawing Sheets

FORM FACTOR FOR A HAND-HELD INFORMATION DEVICE WITH AN OUTPUT DISPLAY

TECHNICAL FIELD

The disclosure herein relates to the field of intelligent electronic devices having digital output display, such as mobile phones, personal digital assistants, and wireless information devices, and form factors related thereto.

BACKGROUND

Portable mobile device such as cell phones often have a substantially box-like rectangular form factor. One reason for this is that a rectangular form factor has been a convenient shape for manufacture and provides smooth faces that accommodate typical layouts of keyboards and flat display panels. In addition, the box-like interior is convenient for housing electronic components such as a battery, circuit board, antennas, and semiconductor chips.

A smartphone, music player, or other portable device fashioned using a box-like case typically has a planar LCD display along one face of the case for displaying information to a user. While typical planar displays are adequate for many purposes, they also include numerous limitations. For example, typical LCD displays only provides a single-directional, two-dimensional view along a limited area of the device. Some devices try to overcome this limitation by the use of multiple displays on different faces of the device. However, limitations remain with those designs too. In order to meet evolving user desires, improvements in mechanical and electronic designs are desired to provide for a greater variety of shapes and configurations of mobile devices.

SUMMARY

In general, in one aspect, implementations of the invention can take the form of a hand-held electronic device having an external casing with a curved surface. The device can be formed from a multitude of layers that have similarly curved surface configured such that the curved surfaces are aligned (i.e., they are proximate to each other). One of the layers may be used to form an output display that is visible when a user is looking at the curved surface of the external casing. Another layer may be a physical stimulus sensor (e.g., a touch sensor or a pressure sensor). The device can include circuitry and components within the casing such as a radio transceiver, battery, antenna, global positioning circuitry, gyroscope, magnetic directional sensor, rotational sensor, a microprocessor, data storage, imaging sensor, Bluetooth, audio amplifier and playback and other circuitry. Data stored in a memory device (e.g., RAM or ROM memory) can be used to program the device's microprocessor to process data from the receiver circuitry and other circuit elements such as the physical stimulus sensor and to display information on the output display based on the received date. The location of the displayed data is determined at least in part on date from the physical stimulus sensor.

In some implementations, the device may be a sphere shaped device—that is the entire exterior surface is curved into the shape of a sphere. A cylindrical shape as well as other device shapes such as conical and free-flowing surface shapes may be used. The display may be curved and sized to provide output on an entire surface of the device. For example, in a spherical implementation, the display may be configured to provide output over the entire surface area (or on a partial area such as a hemisphere of the casing).

In general, in another aspect, the invention includes an output display having numerous closely spaced segments with one or more antenna elements positioned in the spacing between at least some of the display segments. The apparatus may also include tuning circuitry actively and/or dynamically tuning the antenna. The tuning circuitry may include a radio frequency switch, radio frequency filtering circuit, an impedance tuner or other tuning circuitry. A processor connected to the tuning circuitry and to physical stimulus processing circuitry can be configured to adjust an operating characteristic of the antenna based on input from the physical stimulus processing circuitry. For example, the active antenna segments may be selected based on the devices orientation or a touch pattern (e.g., to reconfigure the antenna such that antenna segments in an area of a hand holding the device are not used and instead segments in a non-held area are in use).

In general, in another aspect, the invention includes a method of determining a display orientation in a hand held device having a physical display configuration that inhibits direct visibility of the entire display surface by a user. The method can include receiving input from a physical stimulus sensor selected such as a touch sensor, a pressure sensor and/or a gyroscope. An estimate can then be made of a portion of the display surface that is visible to a user. A display can then be rendered to a user based on the estimate of the portion of the display surface that is visible to the user. Input from the physical stimulus sensor may include, e.g., a touch input such as a motion of a finger across a surface of the hand held device.

DESCRIPTION OF THE DRAWINGS

FIGS. 1A and 1B are diagrams showing aspects of an implementation having a spherical shape. FIG. 1C is a circuit layout diagram.

FIGS. 2A and 2B are diagrams showing aspects of an implementation having a cylindrical shape.

FIGS. 5A and 5B are implementations of a segmented display having antenna components.

FIGS. 6A, 6B, 7A, 7B, 7C illustrate exemplary positioning of optically-transparent antenna components.

DETAILED DESCRIPTION

As the mobile device market grows, manufacturers are looking for ways to distinguish products and to enhance their usability so that they have greater appeal to consumers. Modern consumers want devices with unique industrial designs for aesthetic as well as functional reasons. In accordance with some implementations of the invention, technologies including flexible circuit boards, flexible displays, arbitrarily-shape batteries, and optically-transparent metallic films enable departure from conventional shapes and allow new form factors to be utilized.

Figure 1A:
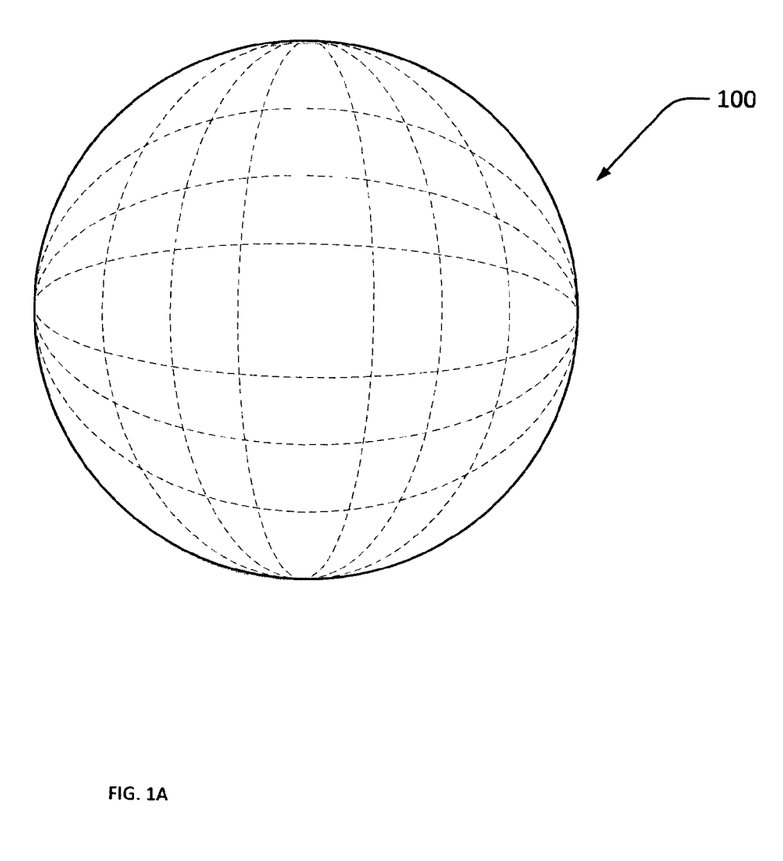
FIG. 1A is a Spherical Device Surface View.
Figure 2A:
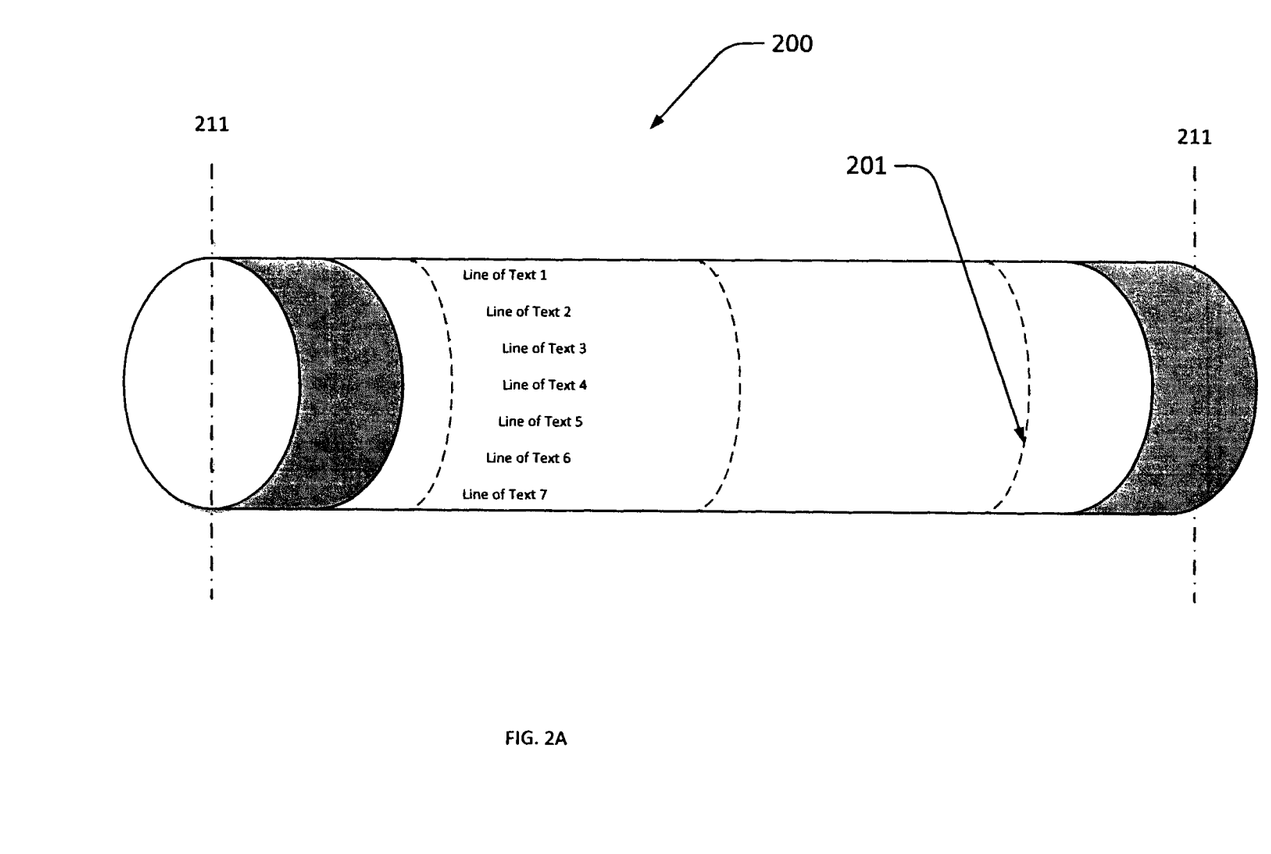
FIG. 2A is Cylindrical Device Exterior View.

FIGS. 1A and 2A show exemplary spherical (i.e. ball-shaped) 100 and cylindrical 200 form factors for hand held electronic devices such as cell phone or wireless accessory. These form factors may be more aesthetically pleasing and can be engineered to be easy to handle and operate by a user.

Figure 1B:
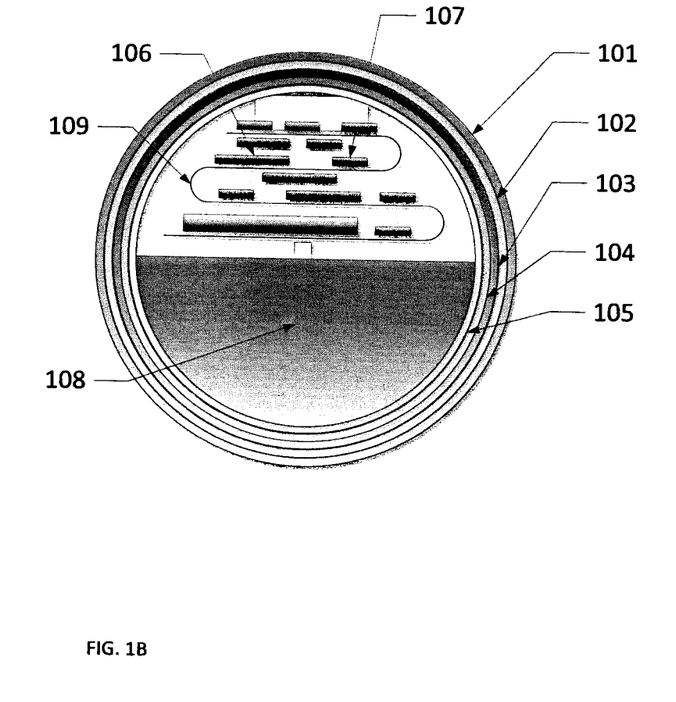
FIG. 1B is a Spherical Device Cross Section View.

FIG. 1B is a cross sectional view of the spherical device 100 along a top-to-bottom meridian line. FIG. 1B shows an exemplary placement of electrical and mechanical components such as battery, display, circuit board, and antenna. Implementations may arrange components in a layered fashion adjacent the outer shell of the sphere. In the example embodiments, five layers are shown 101-105 (arranged from the outer-most first layer 101 to inner-most fifth layer 105). First layer 101 can be an optically-transparent non-metallic enclosing layer providing structural rigidity for the device and protecting interior layers and components. Example materials may include plastic, glass, or other optically transparent material. A second layer 102 provides for touch-sensitive input. Sensing layer 102 may be, e.g., a capacitive touch sensor array or other type of touch sensor. Preferably, touch sensing layer 102 will be an optically-transparent touch input device configured to sense one or more fingers touching the device. In addition, a third layer 103 can include an optically-transparent pressure sensor that enables users to sending commands to the device by squeezing the sphere with different squeezing-and-releasing interaction patterns. These squeeze-and-release interaction patterns can be combined with other sensors (e.g., accelerometer 106, gyroscope 107 shown mounted on circuit board 108) and touch inputs 102 to improve user experience. A fourth layer 104 includes an optically-transparent antenna. The fifth layer 105 includes a display 105 arranged to provide for display along the outer surface of the sphere 100. In some implementations, the display 105 can be made out of light-emitting devices including LEDs or can be a segmented arrangement of display elements as explained with respect to FIGS. 5A and 5B. Other embodiments can use other existing technologies such as flexible display technologies. The display may be arranged such that information can be displayed on the full exterior surface of the sphere 100 or along a portion. The displayable information can be rotated around the surface so that information (e.g., song titles and pictures in a music device implementation) can be directly shared to people around the device.

Figure 1C:
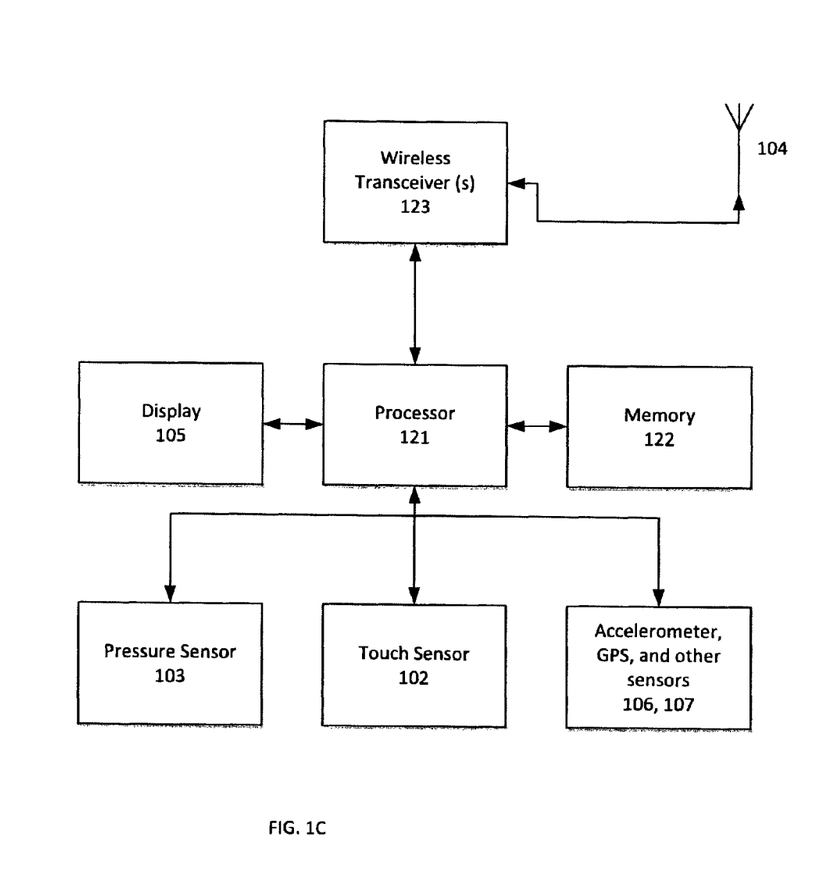
FIG. 1C is Circuit Board Logical View.

Circuit board 108, 208 can be a multi-layer flexible circuit board. The circuit board may also be arranged, e.g., in a continuous cylindrical shape 108 or in a serpentine fashion 208 to provide for increase board size. Routing attachment points on each end of the circuit boards can be soldered directly or laminated together to provide electrical connectivity around the perimeter of the board. The board may also include conventional data processing circuitry such as a microprocessor 121 and ROM and RAM memory 122 as well as radio transceiver circuitry 123 (which could include, e.g., cellular, Bluetooth and 802.11 Wi-Fi transceivers) FIG. 1C.

Figure 2B:
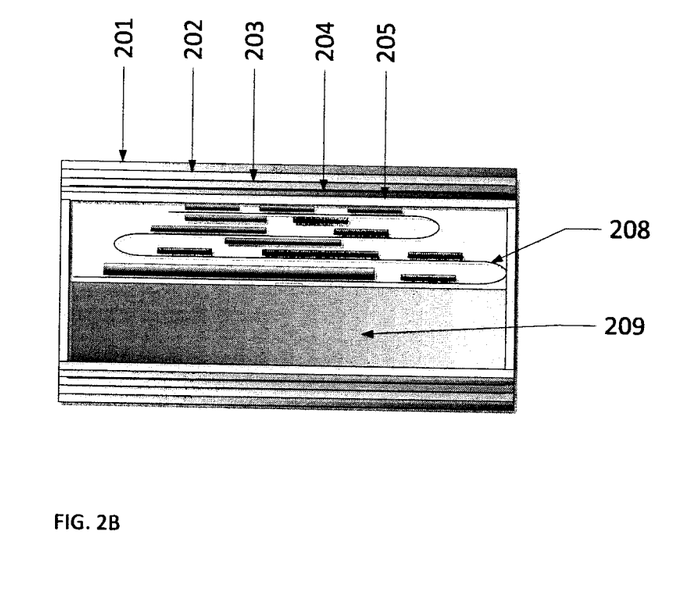
FIG. 2B is Cylindrical Device Cross Section Interior View.

It should be understood that a substantially identical cross sectional view (not separately shown) would also exist for the cylinder 200 when bisected along a plane through the device 200 at the point indicated by, e.g., dotted line 210. In another cross sectional view (FIG. 2B) the cylindrical implementation is shown bisected by a plane passing through the device at points indicated by lines 211. Elements 201-209 of the cylindrical implementation 200 correspond to elements 101-109 of the spherical implementation 100.

Implementations of the devices 100, 200 need not use the particular layer ordering described above and some layers may be eliminated or others added depending on relative transparencies, signal penetration, and structural or other needs. For example, in some cases, touch-sensitive input can be provided by forming sensing elements on an exterior surface of first layer 101. As another example, the order of sensor layers 102 and 103 may be swapped to optimize performance of one of the sensors for specific application. In addition, sensor and antenna components can be co-located in one layer. This may be useful if the platform size is relatively small and it does not require an extremely fine resolution for touch and pressure sensors.

Ergonomics of the device 100, 200 can be enhanced based on the chosen weight distribution within the device. For example, the battery 109, 209 (a relatively heavy component) may be arranged to occupy half of the volume of the device thereby biasing the device to roll to a pre-determined resting orientation. Such a bias can prevent undesired rolling of the device due to its having a rounded form factor and can also help orient the display to a preferred hands-free resting position.

Figure 3:
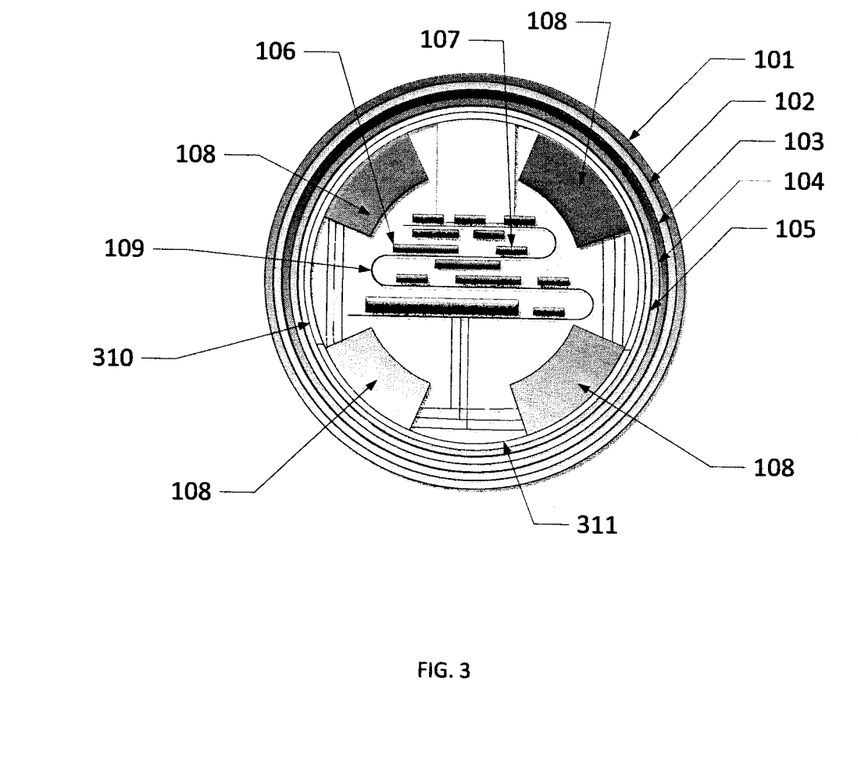
FIG. 3 is an implementation having a spherical shape and centrally located mass.
Figure 4:
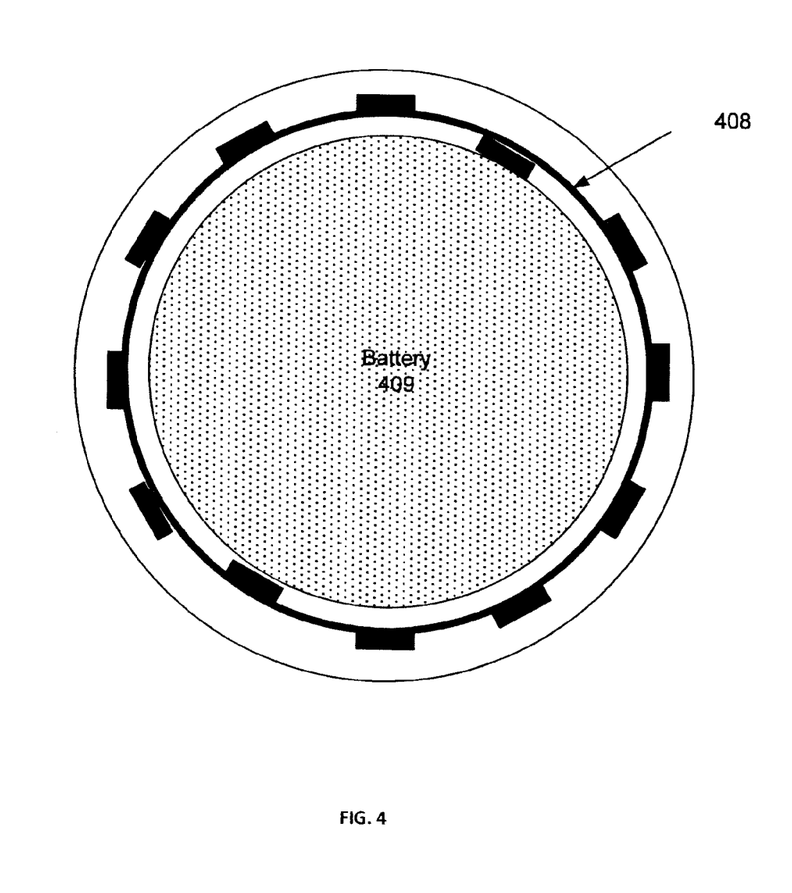
FIG. 4 is an implementation having a cylindrical shape and mass located on a central axis.

In some implementations, rather than a device with a pre-determined positional bias, a free rolling or adjustable positional bias is desired. Free-rolling can be enhanced by more evenly distributing weight within the cavity of the device. For example, as shown in FIG. 3, the battery can be composed of multiple cells which can be positioned within the device to more evenly distribute weight. If a uniform mass-distribution is desired, the mass center of the battery and components can be located at the center of the system as shown in FIG. 4 with the circuit board 408 and electronic components arranged around the battery 409.

Implementations may also include an adjustable positioning bias or a slow-roll bias. This can be provided for by using a liquid-channel layer. FIG. 3 shows a liquid channel formed as an additional layer 310 which may, e.g., be between layers 104-150 or 204-205 of the device 100, 200. The liquid channel can be partially filled with a viscous liquid 311 to slow down the rolling speed. A partially-filled liquid channel can also provide for an adjustable position bias when the device 100, 200 is placed at rest. For example, by holding the device in a particular position for a short time, the viscous liquid would settle in a bottom positing of the device thus setting a positioning bias. Liquid channels can be formed in a number of ways. For example, a meshed structure of channels or multiple narrow channels positioned around the structure can be used to control the speed of the free rolling case and its positioning. In devices including wireless communications, such as Bluetooth or cellular communications, this controllability of rolling speed may also be used to help reduce any Doppler frequency shift by reducing motion of the device.

Figure 5A:
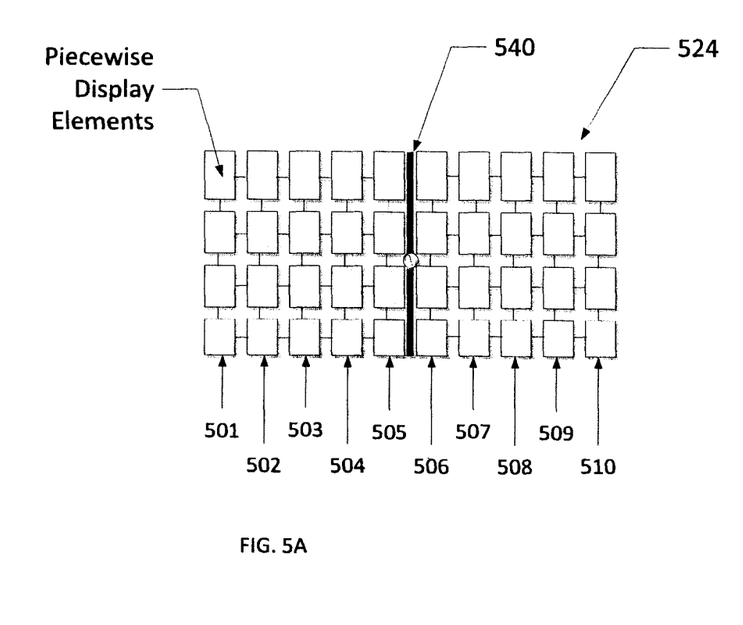
FIG. 5A is Segmented Display-Single Conductive Strip Antenna Configuration.
Figure 5B:
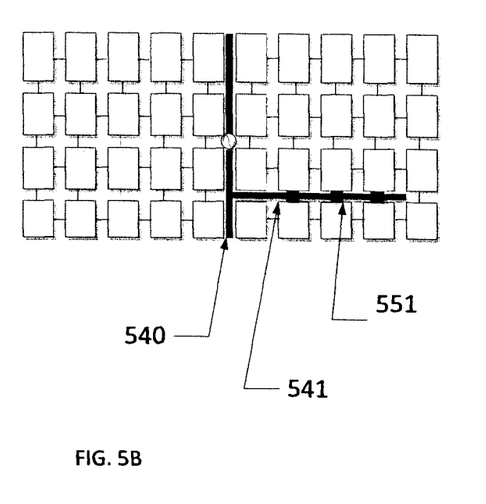
FIG. 5B is Segmented Display Two Conductive Strip Antenna Configuration.

Because of the curved display surfaces of the devices 100, 200, the use of a conventional planar displays may not be practical. In some implementations, a flexible or a non-breakable display may be used. For example, companies are developing flexible displays that are constructed using Organic Light Emitting Diodes on a flexible substrate. However, such display technology may not be suitable for all implementations and other technologies are desired. FIGS. 5A and 5B show a segmented display technology that implementations can use. Note that the gaps between the segments are exaggerated for illustration purpose. The display 500 is composed of multiple closely spaced segments (e.g., 501-510) that are flexibly interconnected (e.g., by mounting on a flexible substrate or by connecting the segments with a flexible conductor 515). The segments 501-510 of display 500 can be arranged to allow the display 501 to be rolled into a cylindrical form or fashioned into a spherical form. In a spherical form, the segments may be of varying shapes and sizes and rows and columns of the display 500 may have differing numbers of elements to allow the display to conform to a spherical shape.

Figure 6A:
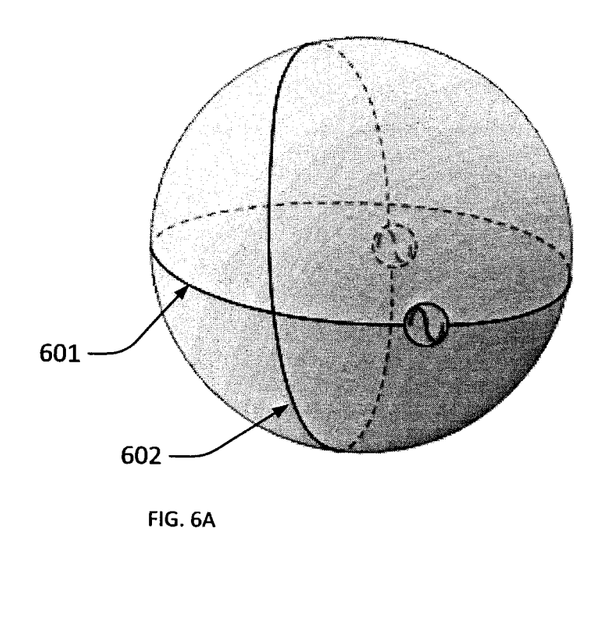
FIG. 6A is Dual Loop Antenna Configuration.
Figure 6B:
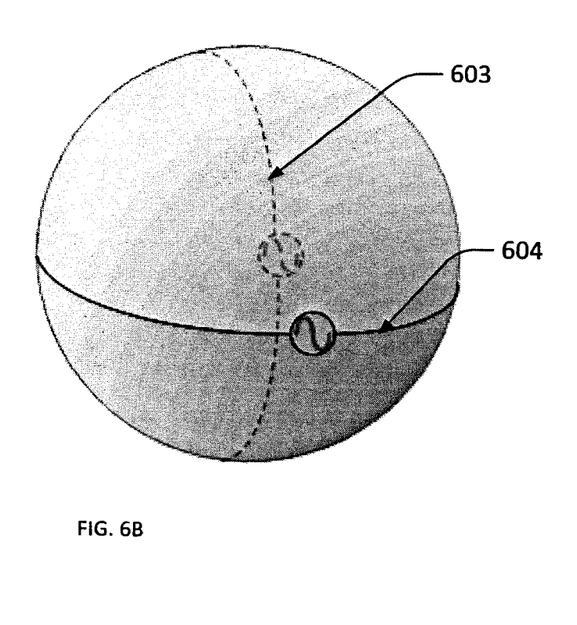
FIG. 6B is Dual Dipole Antenna Configuration.
Figure 7A:
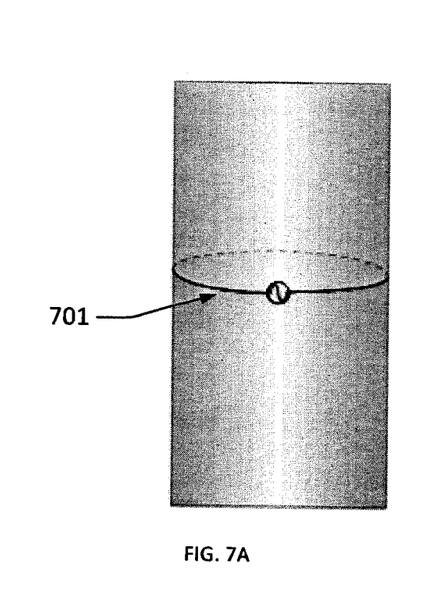
FIG. 7A is Cylindrical Loop Antenna Configuration.
Figure 7B:
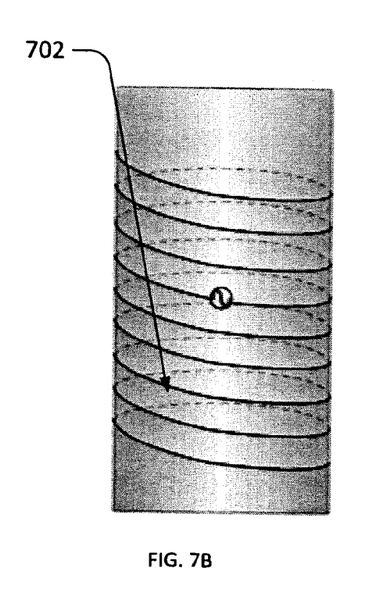
FIG. 7B is Helical Loop Antenna Configuration.
Figure 7C:
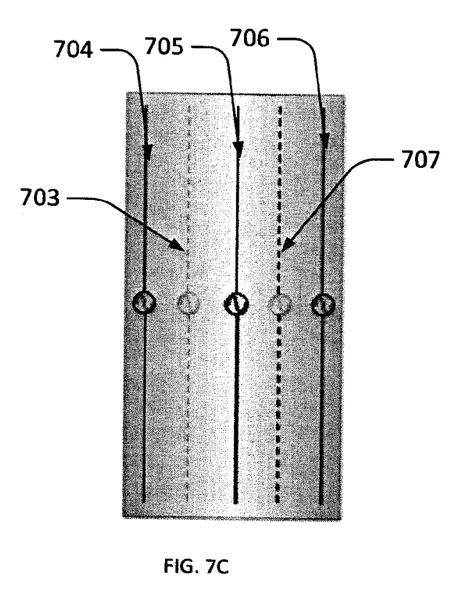
FIG. 7C is Multi-Segment Antenna Configuration.

Gaps (i.e., spaces 520-528, 530-32) between segments of the display 500 can be used as locations for elements of a slot antenna. A slot antenna can be formed of by a conductive strip 540 positioned in one or more of the spaces. For example conductive strip 540 is positioned in gap 524. FIG. 5B shows another implementation having an antenna composed of multiple conductive stripes 540-541. The implementation shown in FIG. 5B can be reconfigurable. For example, RF (radio frequency) switches, filtering circuit network, and/or impedance tuner circuitry 551 can be used to adjust the tuning of the antenna. In addition, angular rotation, touch pattern, and other information obtained from sensors 102-103, 106-107 can be used to determine tuning of the antennas. FIGS. 6A and 6B show additional views of exemplary antenna positions. In FIG. 6A, a dual loop antenna including segments 601-602 is shown while FIG. 6B shows dual dipole antenna (603, 604) configurations. FIGS. 7A-7C show exemplary antenna configurations for a cylindrical implementation. The antenna may, e.g., by a single cylindrical loop 701, a helical loop 702, or composed of multiple segments 703-707. Although implementations may position the antenna segments between segments of a display, such an implementation is not required. Depending on the configuration of the device 100, 200, transparent or non-transparent antennas may be used.

If multiple piece-wise boards are considered in the system, antennas can be located anywhere between the center and outer radius of the system. This capability enables to have an improved re-configurable antenna designs that can minimize near-filed proximity effects degrading antenna performance. Using cylindrical or spherical forms may improve the directional response of the antenna allowing Omni-directional (or near isotropic) coverage. In addition, because these antennas use a bigger volume and/or larger radiation aperture than the conventional antenna designs in the cubical form-factor systems, these antennas generally have a wider operational bandwidth and/or improved radiation efficiency.

Figure 8:
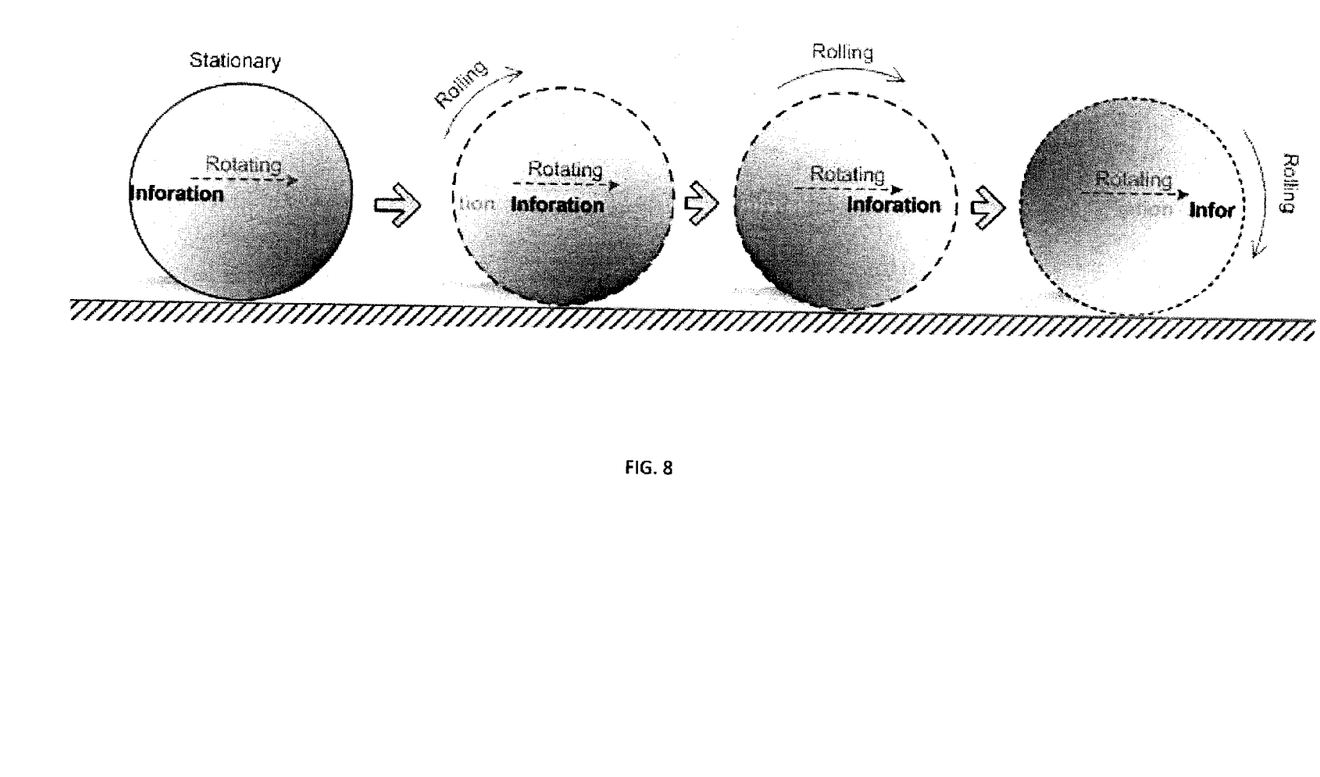
FIG. 8 illustrates an adjustment of display positioning during rotational movement.
Figure 9:
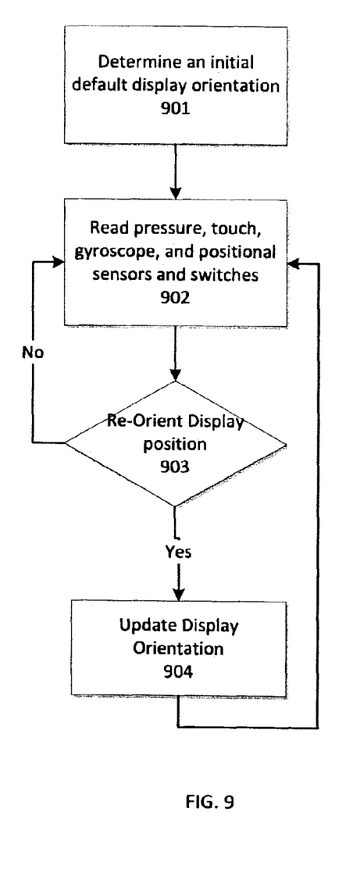
FIG. 9 is a flow chart detailing a display positioning adjustment algorithm.

FIGS. 8 and 9 illustrate operations that can be used to control the display of information using the systems 100, 200. Generally speaking, because a user may be viewing the systems 100, 200 at a variety of angles, an initial default viewing angle can be determined 901. The default viewing angle may, e.g., simply assume an initial angle and viewing orientation. An updated viewing and display position can then be determined 902 based on sensor 102-103, 106-107 inputs. Upon reading sensor input, a determination is made 903 as to whether the input indicates a new display orientation. For example, a user may swipe a finger along a position on the surface of the device 100, 200 in a liner direction to indicate the preferred orientation for a line of text. Upon detection of the liner swipe, the device determines 903 if the swipe indicates a new display position and, if so, updates the display 104 and then continues reading sensor inputs 902. As another example, pressure and touch points corresponding to a user's finger positions as well as input from a gyroscopic sensor can be determined and used to predict a viewing angle and position. In this case, user can rotate or shake the device. Then,— gyroscopic and/or acceleration sensors can help to detect the desired direction and/or position of information display.

Referring to FIG. 8, users can rotate displayed information on the screen with a predefined simple gesture when the system is in stationary mode. When user rolls the system, the stationary or rotating information on the screen can be sustainable in terms of rolling location at the display. This is optional function that user can choose. Accelerometer and/or gyro sensors can detect the rolling status. The angular rotation information obtained from these sensors can be used to adjust the display location in order to make the rotating information sustainable at the same vertical location of the stationary mode. As another example, a rolling motion may be read 902 as indicating a particular switch in display orientation. In some implementations, a rolling motion of the cylinder 200 can be used to indicate a scrolling of a page of display such that as the cylinder is rolled, lines of text roll off the display and new lines roll onto the display allowing a user to traverse and entire page of text.

Figure 10:
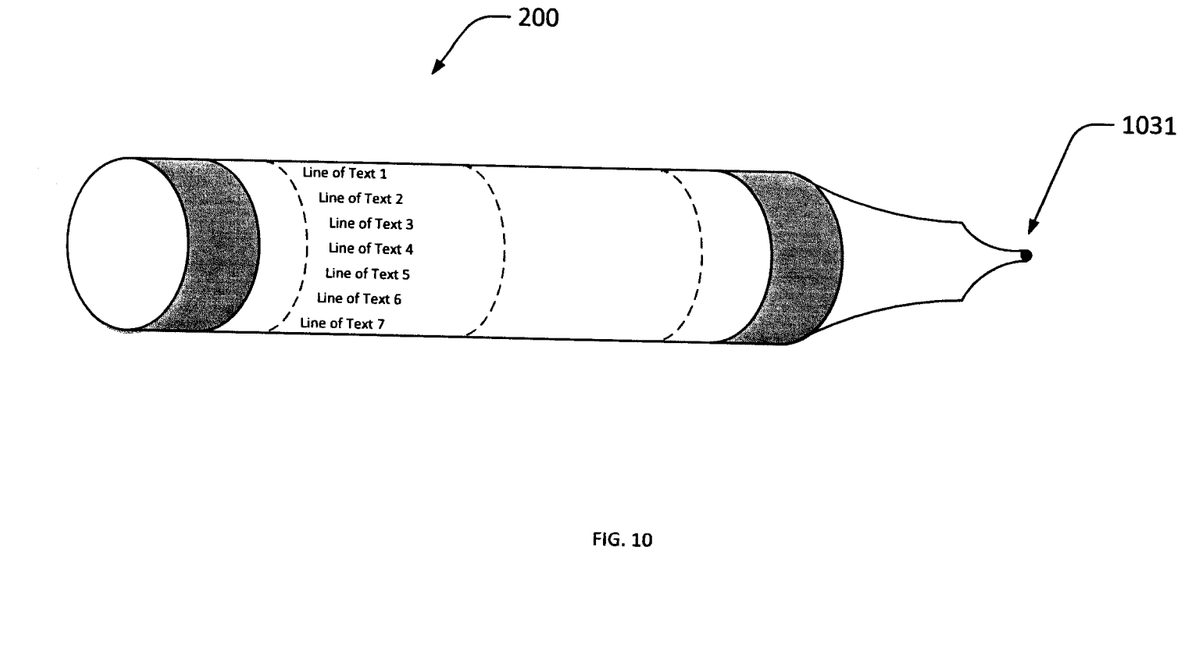
FIG. 10 is an cylindrical implementation fashioned as a writing instrument.

Wireless circuitry can include, e.g., Bluetooth/WiFi circuitry allowing the device to be paired with a cellular phone or other Bluetooth/WiFi device. In such an implementation, a device 200 may be used for display purposes such as displaying incoming email messages, text messages, or incoming phone numbers. The devices 100, 200 may be combined with other mechanical components. For example, referring to FIG. 10, the body 200 of the device may be constructed in the proportions of a conventional pen and a ball point cartridge 1031 may be included to construct a pen with display capabilities that may be Bluetooth/WiFi paired to a phone. In other embodiments, stylus pen cartridge can be implemented for a pointing device or a pen use in digital input devices. In addition, optical pointing device (laser pointer) cartridge can also be implemented.

The antenna can support Bluetooth, WiFi, cellular network, near-field communication(NFC), and/or any emerging communication standard. In some cases, implementations can be configured as a communication/data-sharing hub, which can provide wireless communication connectivity between devices. Even in the case that devices only support a specific protocol (i.e. no direct communication is possible between other devices), the invented device can provide seamless communication by translating or converting one protocol to the other.

The invented device can provide an interesting and exciting data sharing mode. For example, user put the invented device on a table with the sharing mode turn on. Other users locate their devices close to the device. Then, data sharing process starts immediately. In some cases, data sharing indication can be displayed on one device or all the shared devices as a group with some unique visual, audio, and/or vibrational haptic signals. Bluetooth, WiFi, NFC, and/or other emerging communication protocol can be utilized to support this function.

The terms and descriptions used herein are set forth by way of illustration only and are not meant as limitations. For example, circuit components shown in FIG. 1C may be separate integrated circuits or one or more may be integrated with other components such as the processor 121 or implemented in whole or in part as software modules executed by the processor 121 or other processing circuitry. Those skilled in the art will recognize that many variations are possible within the spirit and scope of the invention as defined in the following claims, and their equivalents, in which all terms are to be understood in their broadest possible sense unless otherwise indicated.

What is claimed is:

1. A hand-held electronic device comprising:
   an external casing comprising an area having a curved surface;
   a plurality of layers each having a curved surface and configured for positional arrangement with the curved surfaces proximate each other wherein said layers comprise an output display to render a display visible on at least a portion of the curved surface of the external casing and a physical stimulus sensor; and
   an interior region formed within the external casing, the interior region comprising receiver circuitry operatively coupled to an antenna to enable reception of transmitted radio signals, display control circuitry, a microprocessor, data storage memory, and a battery;
   wherein the data storage memory further comprises stored instructions to configure the microprocessor to process data from the receiver circuitry and the physical stimulus sensor.

2. The device of claim 1 wherein the physical stimulus sensor comprises at least one of a touch sensor, a pressure input sensor, a rotational sensor, and a gyroscope.

3. The device of claim 1 wherein said curved surface of the external casing is a spherical surface and the plurality of layers comprises a spherically shaped display positioned proximate the spherical surface to provide output visible on at least a hemisphere of the spherical surface.

4. The device of claim 1 wherein said curved surface of the external casing is a cylindrical surface.

5. The device of claim 1 wherein the center of mass of the device is arranged to create a positional bias and the microprocessor is configured to calculate a default output display orientation based on the positional bias and to update the display orientation based on input from the physical stimulus sensor.

6. The device of claim 1 wherein:
   the external layer comprises an optically transparent outer enclosing layer; and
   the plurality of layers comprise:
      a touch sensor layer that is optically transparent over at least a portion of its surface;
      a pressure sensor layer that is optically transparent over at least a portion of its surface;
      a display layer configured to render a display visible over at least fifty percent of the device surface.

* * * * *